US012439212B2

(12) United States Patent
Pedersen et al.

(10) Patent No.: US 12,439,212 B2
(45) Date of Patent: Oct. 7, 2025

(54) HEARING ASSISTIVE DEVICE COMPRISING AN ATTACHMENT ELEMENT

(71) Applicant: Oticon A/S, Smoerum (DK)

(72) Inventors: Michael Syskind Pedersen, Smoerum (DK); Carsten Scheel, Smoerum (DK); Martin Bergmann, Frederiksberg C (DK); Henrik Bay, Smoerum (DK); Morten Pedersen, Smoerum (DK); Bent Krogsgaard, Smoerum (DK); Jacob Mikkelsen, Smoerum (DK); Stefan Gram, Copenhagen (DK); Jan M. De Haan, Smoerum (DK); Andreas Thelander Bertelsen, Smoerum (DK)

(73) Assignee: Oticon A/S, Smørum (DK)

( * ) Notice: Subject to any disclaimer, the term of this patent is extended or adjusted under 35 U.S.C. 154(b) by 356 days.

(21) Appl. No.: 18/187,717

(22) Filed: Mar. 22, 2023

(65) Prior Publication Data

US 2023/0308814 A1 Sep. 28, 2023

(51) Int. Cl.

*H04R 25/00* (2006.01)
*G06F 3/16* (2006.01)
*G10L 25/78* (2013.01)

(52) U.S. Cl.

CPC ........... *H04R 25/407* (2013.01); *G06F 3/165* (2013.01); *H04R 25/402* (2013.01);

(Continued)

(58) Field of Classification Search

CPC .. H04R 25/407; H04R 25/402; H04R 25/505; H04R 25/554; H04R 25/604;

(Continued)

(56) References Cited

U.S. PATENT DOCUMENTS

| | | | |
|---|---|---|---|
| 7,912,237 | B2 | 3/2011 | Fischer |
| 8,391,522 | B2 | 3/2013 | Biundo Lotito |

(Continued)

FOREIGN PATENT DOCUMENTS

| | | | | |
|---|---|---|---|---|
| CN | 220823249 U * | 4/2024 | | H04R 1/10 |
| DE | 202013003928 U1 * | 10/2013 | | H04R 1/105 |
| EP | 3902285 A1 | 10/2021 | | |

*Primary Examiner* — Angelica M McKinney

(57) ABSTRACT

A hearing assistive device comprises a multi-microphone system for providing a processed input signal. The multi-microphone system comprises a multitude of microphones for picking up sound from an environment; and a beam-former filter configured to. The hearing assistive device further comprises an attachment element configured to fix the hearing assistive device to the body or clothes of a person. The multi-microphone system is configurable to operate in at least two modes in dependence of a mode control signal, A) a directional mode and B) an omni-directional mode wherein said multi-microphone system is configured to provide said processed input signal as a substantially directional signal, and as a substantially omni-directional signal, respectively. The attachment element is configured to provide an electric signal indicative of a current state of the attachment element. The hearing assistive device further comprises a mode controller for providing said mode control signal in dependence of said electric signal indicative of a current state of the attachment element.

20 Claims, 7 Drawing Sheets

(52) U.S. Cl.
CPC ......... *H04R 25/505* (2013.01); *H04R 25/554* (2013.01); *H04R 25/604* (2013.01); *G10L 25/78* (2013.01); *H04R 2225/55* (2013.01)

(58) Field of Classification Search
CPC ........................ H04R 2225/55; H04R 2430/20; H04R 3/005; H04R 1/406; H04R 25/50; H04R 2225/43; G06F 3/165; G10L 25/78; G10L 2021/02166; H04S 7/308
See application file for complete search history.

(56) References Cited

U.S. PATENT DOCUMENTS

| | | | | |
|---|---|---|---|---|
| 11,330,366 | B2 * | 5/2022 | Pedersen | H04R 3/005 |
| 2010/0278365 | A1 | 11/2010 | Phonak | |
| 2010/0278366 | A1 | 11/2010 | Biundo Lotito | |
| 2014/0098983 | A1 * | 4/2014 | Clow | H04R 1/10<br>381/381 |
| 2018/0054683 | A1 * | 2/2018 | Pedersen | H04R 25/554 |
| 2022/0198401 | A1 * | 6/2022 | Uemoto | H04W 4/38 |
| 2022/0417677 | A1 * | 12/2022 | Wexler | H04R 25/554 |

* cited by examiner

HEARING ASSISTIVE DEVICE COMPRISING AN ATTACHMENT ELEMENT

TECHNICAL FILED

The present disclosure relates to the field of hearing aids, in particular to an assistive sound pick-up device external to the hearing aid, specifically to a hearing assistive device (e.g. a microphone unit) comprising a multitude of microphones, e.g. a microphone array.

A microphone array consisting of at least two microphones has the ability to apply directional processing in order to enhance a desired sound signal. Directional processing is desirable, when the sound of interest always is impinging from the same direction. When a microphone unit is attached to a person, the person's voice is of interest. Given that the microphone unit is correctly mounted, the array always points towards the user's mouth. Hereby directional processing can be applied in order to enhance the users own voice, while background noise is attenuated.

The microphone unit is able to catch the sound of interest and transmit the sound directly to e.g. a hearing instrument user. Hereby typically a better signal to noise ratio is obtained compared to the sound picked up by the hearing instrument microphones.

The microphone is however not always used to pick up the voice of a single talker. Sometimes the microphone unit may be placed at or on a table in order to pick up the sound of any person placed around the table. In this situation, an omni-directional response of the microphone is more desirable than a directional response. The two use cases are illustrated in FIG. 1.

U.S. Pat. No. 8,391,522B2 suggests to use an accelerometer to change the processing of an external microphone array.

U.S. Pat. No. 7,912,237B2 suggests to use an orientation sensor to change between omni-directional and directional processing of an external microphone array.

SUMMARY

The present disclosure discloses a hearing assistive device comprising a multitude of microphones, the hearing assistive device comprising an attachment element (e.g. a shirt clip) at least configured to be attached to clothing of a user and a scheme for adjusting signal processing in the hearing assistive device based on the use of the attachment element.

A First Hearing Assistance Device:

In a first aspect of the present application, a first hearing assistive device is provided. The first hearing assistive device comprises a processor for processing an input audio signal and providing (e.g. as an output) a processed input signal, and an attachment element comprising first and second mutually movable mechanical parts allowing the attachment element to grip an item, the hearing assistive device being configured to control said processing in the hearing assistive device in dependence of the attachment element being in a first or second state determined by monitoring a current flowing through said first and second mutually movable mechanical parts.

Thereby an improved hearing assistive device may be provided.

The different first and second states of the attachment element may refer to mechanical as well as electrical states. The first state may be a state where the attachment element is mechanically and electrically open due to its gripping around an item. The second state may be a state where the attachment element is mechanically and electrically closed (e.g. due to its not gripping around an electrically isolating item).

The hearing assistive device may comprise a noise reduction system forming part of the processor. The noise reduction system may comprise a directional system forming part of the processor.

The processing may include one or more of:

- switching between two modes operation of said directional system;
- applying direction of interest to a voice activity detector, by selecting between
  - Own voice direction VAD constraint in a shirt mode, and
  - Omni-directional VAD, otherwise; and
- switching between a multi-microphone-based noise reduction post filter of said noise reduction system in a shirt mode of operation and a single microphone-based noise reduction, or using directional information, in table mode of operation.

The switching between two modes operation of said directional system may comprise one or more of

- switching between a fixed target direction mode and an adaptive target direction estimation mode of operation;
- switching between a directional mode of operation and a non-directional, termed omni-directional, mode of operation; and
- switching between a near-field directional mode and far-field directional mode.

The first hearing assistive device comprises an attachment element configured to fix the hearing assistive device to a person. The attachment element is configured to be set in different first ('open') and second ('closed') states. The first hearing assistive device may be configured to provide an electric signal indicative of a current state of the attachment element, termed the attachment element state signal. The first hearing assistive device may be configured to operate in at least two modes in dependence of the attachment element state signal. The first ('open') state may refer to a state where the attachment element is fixed to the person. The attachment element may e.g. be attachable to (and detachable from) clothes worn by the person, or to other objects worn or carried by the person. The second ('closed') state may refer to a state where the attachment element is not fixed to anything (such as a person). The attachment element may e.g. be located on a carrier (e.g. a table or held in a hand). The attachment element may have the form of a clip, e.g. comprising mutually movable mechanical parts allowing the clip to grip (and thereby to be attached to) an item, e.g. a substrate, e.g. clothing. The clip, e.g. the mutually movable mechanical parts may be electrically conducting (or comprise electrically conducting elements, e.g. wires). The substrate may be electrically insulating (e.g. having an electrical conductance below a threshold value). The substrate may be configured to have a substantially higher electrical resistance than the mutually movable mechanical parts of the attachment element.

The different first ('open') and second ('closed') states of the attachment element may refer to mechanical as well as electrical states. The first (open) state may be a state where the attachment element is mechanically and electrically open (e.g. not electrically connected, e.g. due to its gripping around a substrate). The second (closed state) may be a state where the attachment element is mechanically and electrically closed (e.g. electrically connected, in that the attachment is in a relaxed state, not gripping around any substrate).

The hearing assistive device (e.g. a multi-microphone system) may be configurable to operate in at least two modes in dependence of the state of the attachment element (e.g. an attachment element state signal). A choice between a directional mode (DIR) and an (substantially) omni-directional (OMNI) mode of operation may thereby be implemented using the attachment element. In addition to or as an alternative to the DIR and OMNI modes, a choice between a near-field directional mode and far-field directional mode may be implemented.

Further, a choice between two modes of operation of the hearing assistive device (e.g. a microphone unit) need not necessarily be related to the directional microphone system. Other options might relate to a feedback control algorithm (e.g. in that the feedback control system is switched ON or OFF (or set in different modes of 'aggression' (e.g. different step sizes in an adaptive algorithm) of the feedback control system) in dependence of the state of the attachment element.

In an even more general aspect, the hearing assistive device (e.g. a microphone unit) comprising an attachment element according to the present disclosure may be configured to control processing in the hearing assistive device in dependence of the attachment element being in the first or second state (as e.g. indicated by monitoring a current flowing through the attachment element, e.g. through the mutually movable mechanical parts allowing the clip to grip an item, e.g. a substrate, e.g. clothing).

The first hearing assistive device may comprise a movement sensor (e.g. an accelerometer) configured to indicate whether or not the hearing assistance device is being moved, e.g. to be (further) included in an attempt to further confirm a selection of a mode of operation of the hearing device.

The first hearing assistive device may further comprise antenna and transceiver circuitry configured to establish a communication link to another device, e.g. to a hearing aid or a headset or a telephone, depending in the application in question. The first hearing assistive device may further be configured to transmit a signal estimating the voice or voices picked up by the microphone system of the hearing assistive device to another device.

A Second Hearing Assistive Device:

In a second aspect of the present application, a second hearing assistive device is provided. The second hearing assistive device comprises

- a multi-microphone system for providing a processed input signal, the multi-microphone system comprising
  - a multitude of microphones for picking up sound from an environment of the hearing assistive device, each of the multitude of microphones providing an electric input signal representing the sound;
  - a beamformer filter configured to receive the electric input signals, or signals originating therefrom, and to provide a spatially filtered signal in dependence of the electric input signals and fixed or adaptively determined beamformer weights;
- an attachment element configured to fix the hearing assistive device to the body or clothes of a person, the attachment element being configured to be in a first, open, state, when attached to clothing or other body-worn items, and in a second, closed, state, when un-attached to clothing or other body-worn items, and wherein the hearing assistive device is configured to provide an electric signal, termed the attachment element state signal, indicative thereof
- wherein the multi-microphone system is configurable to operate in at least two modes in dependence of the attachment element state signal, said at least two modes comprising
  - a) a directional mode wherein said multi-microphone system is configured to provide said processed input signal as a substantially directional signal,
  - b) an omni-directional mode wherein said multi-microphone system is configured to provide said processed input signal as a substantially omni-directional signal; and
- wherein the hearing aid is configured to automatically bring the multi-microphone system
  - in said directional mode, when said attachment element state signal indicates that the attachment element is in the first, open, state, and
  - in said omni-directional mode, when said attachment element state signal indicates that the attachment element is in the second, closed, state.

Thereby an improved hearing assistive device may be provided.

A Third Hearing Assistive Device:

In a third aspect of the present application, a third hearing assistive device is provided. The third hearing assistive device comprises

- a multi-microphone system for providing a processed input signal, the multi-microphone system comprising
  - a multitude of microphones for picking up sound from an environment of the hearing assistive device, each of said multitude of microphones providing an electric input signal representing said sound; and
  - a beamformer filter configured to receive said electric input signals, or signals originating therefrom, and to provide a spatially filtered signal in dependence of said electric input signals and fixed or adaptively determined beamformer weights;
- an attachment element configured to fix the hearing assistive device to the body or clothes of a person, the attachment element being configured to be in different first, open and second, closed states; and
- wherein the multi-microphone system is configurable to operate in at least two modes in dependence of a mode control signal, said at least two modes comprising
  - a directional mode wherein said multi-microphone system is configured to provide said processed input signal as a substantially directional signal,
  - an omni-directional mode wherein said multi-microphone system is configured to provide said processed input signal a substantially omni-directional signal.

The attachment element is configured to provide an electric signal indicative of a current state of the attachment element. The hearing assistive device further comprises a mode controller for providing said mode control signal in dependence of said electric signal indicative of a current state of the attachment element.

Thereby an improved hearing assistive device may be provided.

It is the intention that the first, second and third hearing assistive devices may be combined with the following features as appropriate.

The attachment element may have the form of a clip comprising mutually movable first and second mechanical parts allowing the clip to grip (e.g. around an item, such as a substrate or a piece of clothing) and thereby to be attached to an item (etc.), and wherein the mutually movable first and second mechanical parts comprise respective first and second electrically conducting elements.

The first and second mutually movable mechanical parts (and hence said the first and second electrically conductive elements) may be configured to be spatially separated from each other in said first, open, state and to be electrically connected in said second, closed, state, respectively.

In other words, the first, open, and second, closed, states may be configured to implement an electric switch. The first, open state may implement an electrical OFF state (e.g. a logic zero). The second, closed state may implement an electrical ON state (e.g. a logic one).

The person to which the hearing assistive device is fixed (using the attachment element) may be any person, whose voice is intended to be picked up in a good quality, typically another person than a hearing aid wearer. However, the hearing assistive device may be fixed to a hearing aid wearer (and hence configured to pick up the hearing aid wearers' voice, e.g. for being transmitted to the hearing aid, or to another device, e.g. a communication device, such as a telephone, e.g. in a specific communication mode.

The hearing assistive device may further be adapted to lie on a surface or carrier, e.g. a table. The attachment element may be configured to be in different states depending on whether it is a) fixed to a body or clothes of a person orb) located on a surface or carrier.

The hearing assistive device may be adapted to enter a directional mode (also termed shirt mode), when fixed to a body or clothes of a person. The hearing assistive device may be adapted to enter an omni-directional mode (also termed 'table mode'), when located on a surface or carrier.

The hearing assistive device, e.g. the mode controller, may be configured to provide the mode control signal in dependence of the electric signal indicative of a current state of the attachment element. The attachment element may a) in the first, open, state be configured to be attached to clothing or other body-worn items, and (thereby, automatically) to enter the directional mode; and b) in the second, closed, state be configured to be un-attached to clothing or other body-worn items, and (thereby, automatically) to enter the omni-directional mode.

The attachment element in said first, open state may be configured to be attached to clothing or other body-worn items. The clothing may e.g. be clothing worn by the user that are intended to wear the hearing assistive device. Other body-worn items, may be a substrate or carrier worn by or otherwise attached to the user, e.g. on the user's body or on clothing worn by the user. The attachment element may in the second, closed state be configured to be un-attached to clothing, e.g. not be attached to any substrate or carrier. The attachment element may in the second, closed state e.g. be lying on a substrate or carrier, e.g. a table.

The attachment element may be reversibly brought into the first and second states.

The mode controller may be configured to bring the multi-microphone system into said directional mode when the attachment element is in said open state.

The mode controller may be configured to bring the multi-microphone system into said omni-directional mode when the attachment element is in said closed state.

The hearing assistive device may comprise a housing wherein components of the hearing assistive device are enclosed.

The hearing assistive device may be adapted to provide that the attachment element is mounted on or integrated with said housing of the hearing assistive device.

The hearing assistive device may comprise memory wherein beamformer weights of the beamformer filter, or parameters for determining such beamformer weights, are stored.

The attachment element may comprise a shirt clip configured to be attached to a shirt or other clothing or substrate worn by or attached to the user. The hearing assistive device may e.g. be attached to a shirt below the mouth of the user (cf. e.g. FIG. 1A). The substrate may comprise a non-electrically conductive part whereto the attachment element can be fixed. The shirt or other clothing or substrate may be non-electrically conducting (or at least have an electric conductance below a threshold value).

The attachment element may comprise first and second electrically conductive parts (or elements) configured to be spatially separated from each other in said first, open state and to be electrically connected in said second, closed state, respectively.

The hearing assistive device may comprise a transmitter for transmitting the processed input signal, or a signal originating therefrom, to another device. The 'another device' may e.g. be a hearing aid (e.g. worn by the user, or worn by a communication partner of the user).

The mode controller may be configured to apply a delay in activation of a detected mode change. In order to avoid that short switching between the open and closed mode results in a mode change, e.g. due to a poor connection between the contacts, the connection signal could be low-pass-filtered and based on two thresholds in order to determine if the mode is open or closed. Also, hysteresis may be built into the system. E.g. no change of mode before the system has detected "open" or "closed" for short duration of time such as after 1 second, 3 seconds, 5 seconds or ten seconds.

Features of the Hearing Aid or Hearing Assistive Device:

The hearing aid may be adapted to provide a frequency dependent gain and/or a level dependent compression and/or a transposition (with or without frequency compression) of one or more frequency ranges to one or more other frequency ranges, e.g. to compensate for a hearing impairment of a user. The hearing aid may comprise a signal processor for enhancing the input signals and providing a processed output signal (based thereon).

The hearing aid may comprise an output unit for providing a stimulus perceived by the user as an acoustic signal based on a processed electric signal. The output unit may comprise a number of electrodes of a cochlear implant (for a CI type hearing aid) or a vibrator of a bone conducting hearing aid. The output unit may comprise an output transducer. The output transducer may comprise a receiver (loudspeaker) for providing the stimulus as an acoustic signal to the user (e.g. in an acoustic (air conduction based) hearing aid). The output transducer may comprise a vibrator for providing the stimulus as mechanical vibration of a skull bone to the user (e.g. in a bone-attached or bone-anchored hearing aid). The output unit may (additionally or alternatively) comprise a transmitter for transmitting sound picked up-by the hearing aid to another device, e.g. a far-end communication partner (e.g. via a network, e.g. in a telephone mode of operation, or in a headset configuration).

The hearing aid and hearing assistive device may comprise an input unit for providing an electric input signal representing sound. The input unit may comprise an input transducer, e.g. a microphone, for converting an input sound to an electric input signal. The input unit may comprise a wireless receiver for receiving a wireless signal comprising or representing sound and for providing an electric input signal representing said sound.

The wireless receiver and/or transmitter may e.g. be configured to receive and/or transmit an electromagnetic signal in the radio frequency range (3 kHz to 300 GHz). The wireless receiver and/or transmitter may e.g. be configured to receive and/or transmit an electromagnetic signal in a frequency range of light (e.g. infrared light 300 GHz to 430 THz, or visible light, e.g. 430 THz to 770 THz).

The hearing aid and hearing assistive device may comprise a directional microphone system adapted to spatially filter sounds from the environment, and thereby enhance a target acoustic source among a multitude of acoustic sources in the local environment of the user wearing the hearing aid. The directional system may be adapted to detect (such as adaptively detect) from which direction a particular part of the microphone signal originates. This can be achieved in various different ways as e.g. described in the prior art. In hearing aids, a microphone array beamformer is often used for spatially attenuating background noise sources. The beamformer may comprise a linear constraint minimum variance (LCMV) beamformer. Many beamformer variants can be found in literature. The minimum variance distortionless response (MVDR) beamformer is widely used in microphone array signal processing. Ideally the MVDR beamformer keeps the signals from the target direction (also referred to as the look direction) unchanged, while attenuating sound signals from other directions maximally. The generalized sidelobe canceller (GSC) structure is an equivalent representation of the MVDR beamformer offering computational and numerical advantages over a direct implementation in its original form.

The hearing aid may comprise antenna and transceiver circuitry allowing a wireless link to an entertainment device (e.g. a TV-set), a communication device (e.g. a telephone), a hearing assistive device, e.g. a wireless microphone, or another hearing aid, etc. The hearing aid may thus be configured to wirelessly receive a direct electric input signal from another device, e.g. a hearing assistive device. Likewise, the hearing aid and hearing assistive device may be configured to wirelessly transmit a direct electric output signal to another device, e.g. to a communication device, such as a smartphone, or to a hearing aid. The direct electric input or output signal may represent or comprise an audio signal and/or a control signal and/or an information signal.

In general, a wireless link established by antenna and transceiver circuitry of the hearing aid or the hearing assistive device can be of any type. The wireless link may be a link based on near-field communication, e.g. an inductive link based on an inductive coupling between antenna coils of transmitter and receiver parts. The wireless link may be based on far-field, electromagnetic radiation. Preferably, frequencies used to establish a communication link between the hearing aid and the other device (e.g. the hearing assistive device) is below 70 GHz, e.g. located in a range from 50 MHz to 70 GHz, e.g. above 300 MHz, e.g. in an ISM range above 300 MHz, e.g. in the 900 MHz range or in the 2.4 GHz range or in the 5.8 GHz range or in the 60 GHz range (ISM=Industrial, Scientific and Medical, such standardized ranges being e.g. defined by the International Telecommunication Union, ITU). The wireless link may be based on a standardized or proprietary technology. The wireless link may be based on Bluetooth technology (e.g. Bluetooth Low-Energy technology), or Ultra WideBand (UWB) technology.

The hearing aid may be or form part of a portable (i.e. configured to be wearable) device, e.g. a device comprising a local energy source, e.g. a battery, e.g. a rechargeable battery. The hearing aid may e.g. be a low weight, easily wearable, device, e.g. having a total weight less than 100 g, such as less than 20 g, e.g. less than 5 g.

The hearing aid and the hearing assistive device may comprise a 'forward' (or 'signal') path for processing an audio signal between an input and an output of the hearing aid. A signal processor may be located in the forward path. The signal processor may be adapted to provide a frequency dependent gain according to a user's particular needs (e.g. hearing impairment). The hearing aid may comprise an 'analysis' path comprising functional components for analyzing signals and/or controlling processing of the forward path. Some or all signal processing of the analysis path and/or the forward path may be conducted in the frequency domain, in which case the hearing aid comprises appropriate analysis and synthesis filter banks. Some or all signal processing of the analysis path and/or the forward path may be conducted in the time domain.

The hearing aid or the hearing assistive device, e.g. an input unit, and or antenna and transceiver circuitry may comprise a transform unit for converting a time domain signal to a signal in the transform domain (e.g. frequency domain or Laplace domain, etc.). The transform unit may be constituted by or comprise a TF-conversion unit for providing a time-frequency representation of an input signal. The time-frequency representation may comprise an array or map of corresponding complex or real values of the signal in question in a particular time and frequency range. The TF conversion unit may comprise a filter bank for filtering a (time varying) input signal and providing a number of (time varying) output signals each comprising a distinct frequency range of the input signal. The TF conversion unit may comprise a Fourier transformation unit (e.g. a Discrete Fourier Transform (DFT) algorithm, or a Short Time Fourier Transform (STFT) algorithm, or similar) for converting a time variant input signal to a (time variant) signal in the (time-)frequency domain. The frequency range considered by the hearing aid from a minimum frequency $f_{min}$ to a maximum frequency $f_{max}$ may comprise a part of the typical human audible frequency range from 20 Hz to 20 kHz, e.g. a part of the range from 20 Hz to 12 kHz. Typically, a sample rate $f_s$ is larger than or equal to twice the maximum frequency $f_{max}$, $f_s \geq 2f_{max}$. A signal of the forward and/or analysis path of the hearing aid may be split into a number NI of frequency bands (e.g. of uniform width), where NI is e.g. larger than 5, such as larger than 10, such as larger than 50, such as larger than 100, such as larger than 500, at least some of which are processed individually. The hearing aid may be adapted to process a signal of the forward and/or analysis path in a number NP of different frequency channels ($NP \leq NI$). The frequency channels may be uniform or non-uniform in width (e.g. increasing in width with frequency), overlapping or non-overlapping.

The hearing aid or the hearing assistive device may be configured to operate in different modes, e.g. a normal mode and one or more specific modes, e.g. selectable by a user, or automatically selectable. A mode of operation may be optimized to a specific acoustic situation or environment, e.g. a communication mode, such as a telephone mode. A mode of operation may include a low-power mode, where functionality of the hearing aid is reduced (e.g. to save power), e.g. to disable wireless communication, and/or to disable specific features of the hearing aid. A mode of operation may include a directional mode and an omni-directional mode of a microphone system of the hearing aid or the hearing assistive device.

The hearing aid or the hearing assistive device may comprise a number of detectors configured to provide status signals relating to a current physical environment of the hearing aid (e.g. the current acoustic environment), and/or to a current state of the user wearing the hearing aid, and/or to a current state or mode of operation of the hearing aid or the hearing assistive device. Alternatively or additionally, one or more detectors may form part of an external device in communication (e.g. wirelessly) with the hearing aid and/or the hearing assistive device. An external device may e.g. comprise another hearing aid, a remote control, and audio delivery device, a telephone (e.g. a smartphone), an external sensor, etc.

One or more of the number of detectors may operate on the full band signal (time domain). One or more of the number of detectors may operate on band split signals ((time-) frequency domain), e.g. in a limited number of frequency bands.

The number of detectors may comprise a level detector for estimating a current level of a signal of the forward path. The detector may be configured to decide whether the current level of a signal of the forward path is above or below a given (L-)threshold value. The level detector operates on the full band signal (time domain). The level detector operates on band split signals ((time-) frequency domain).

The hearing aid or the hearing assistive device may comprise a voice activity detector (VAD) for estimating whether or not (or with what probability) an input signal comprises a voice signal (at a given point in time). A voice signal may in the present context be taken to include a speech signal from a human being. It may also include other forms of utterances generated by the human speech system (e.g. singing). The voice activity detector unit may be adapted to classify a current acoustic environment of the user as a VOICE or NO-VOICE environment. This has the advantage that time segments of the electric microphone signal comprising human utterances (e.g. speech) in the user's environment can be identified, and thus separated from time segments only (or mainly) comprising other sound sources (e.g. artificially generated noise). The voice activity detector may be adapted to detect as a VOICE also the user's own voice. Alternatively, the voice activity detector may be adapted to exclude a user's own voice from the detection of a VOICE.

The hearing aid or the hearing assistive device may comprise an own voice detector for estimating whether or not (or with what probability) a given input sound (e.g. a voice, e.g. speech) originates from the voice of the user of the system. A microphone system of the hearing aid or the hearing assistive device may be adapted to be able to differentiate between a user's own voice and another person's voice and possibly from NON-voice sounds.

The number of detectors may comprise a movement detector, e.g. an acceleration sensor. The movement detector may be configured to detect movement of the user, e.g. of the user's facial muscles and/or bones, e.g. due to speech or chewing (e.g. jaw movement) and to provide a detector signal indicative thereof.

The hearing aid or the hearing assistive device may comprise a classification unit configured to classify the current situation based on input signals from (at least some of) the detectors, and possibly other inputs as well. In the present context 'a current situation' may be taken to be defined by one or more of a) the physical environment (e.g. including the current electromagnetic environment, e.g. the occurrence of electromagnetic signals (e.g. comprising audio and/or control signals) intended or not intended for reception by the hearing aid, or other properties of the current environment than acoustic);
b) the current acoustic situation (input level, feedback, etc.), and
c) the current mode or state of the user (movement, temperature, cognitive load, etc.);
d) the current mode or state of the hearing aid (program selected, time elapsed since last user interaction, etc.) and/or of another device in communication with the hearing aid or the hearing assistive device.

The classification unit may be based on or comprise a neural network, e.g. a trained neural network.

The hearing aid may further comprise other relevant functionality for the application in question, e.g. compression, noise reduction, feedback control, etc.

The hearing aid may comprise a hearing instrument, e.g. a hearing instrument adapted for being located at the ear or fully or partially in the ear canal of a user, e.g. a headset, an earphone, an ear protection device or a combination thereof.

A hearing system may comprise a hearing aid and a hearing assistive device according to the present disclosure, e.g. a microphone unit (comprising a microphone array), or speakerphone (comprising a number of input transducers and a number of output transducers, e.g. for use in an audio conference situation), e.g. comprising a beamformer filtering unit, e.g. providing multiple beamforming capabilities.

Use:

In an aspect, use of a hearing aid and/or a hearing assistive device as described above, in the 'detailed description of embodiments' and in the claims, is moreover provided. Use may e.g. be provided in a system comprising one or more hearing aids (e.g. hearing instruments), headsets, ear phones, active ear protection systems, etc., and a hearing assistive device.

A Hearing System:

In an aspect, a hearing system comprising a hearing assistive device as described above, in the detailed description of embodiments and in the claims, and a hearing aid, is furthermore provided by the present application. The hearing system may be adapted to provide that the hearing aid comprises a (e.g. wireless) receiver configured to receive audio data from the hearing assistive device.

It is intended that some or all of the structural features of the hearing assistive device described above, in the 'detailed description of embodiments' or in the claims can be combined with embodiments of the hearing system.

The audio data may e.g. comprise said processed input signal, or a signal originating therefrom, provided by the hearing assistive device. The hearing system may be configured to allow an exchange of data between the hearing assistive device and the hearing aid (or hearing aids) of the hearing system.

The hearing system may comprise a user interface allowing a user to influence functionality of the system, including to enter and/or leave a mode of operation.

The hearing aid may be constituted by or comprise an air-conduction type hearing aid, a bone-conduction type hearing aid, a cochlear implant type hearing aid, or a combination thereof.

In a further aspect, a hearing system as described above, in the 'detailed description of embodiments', and in the claims, AND an auxiliary device is moreover provided.

The hearing system may be adapted to establish a communication link between the hearing aid and the auxiliary device to provide that information (e.g. control and status signals, possibly audio signals) can be exchanged or forwarded from one to the other.

The auxiliary device may comprise a remote control, a smartphone, or other portable or wearable electronic device, such as a smartwatch or the like.

The auxiliary device may be constituted by or comprise a remote control for controlling functionality and operation of the hearing aid(s). The function of a remote control may be implemented in a smartphone, the smartphone possibly running an APP allowing to control the functionality of the audio processing device via the smartphone (the hearing aid(s) comprising an appropriate wireless interface to the smartphone, e.g. based on Bluetooth or some other standardized or proprietary scheme).

The auxiliary device may be constituted by or comprise an audio gateway device adapted for receiving a multitude of audio signals (e.g. from an entertainment device, e.g. a TV or a music player, a telephone apparatus, e.g. a mobile telephone or a computer, e.g. a PC) and adapted for selecting and/or combining an appropriate one of the received audio signals (or combination of signals) for transmission to the hearing aid.

The auxiliary device may be constituted by or comprise another hearing aid. The hearing system may comprise two hearing aids adapted to implement a binaural hearing system, e.g. a binaural hearing aid system.

An APP:

In a further aspect, a non-transitory application, termed an APP, is furthermore provided by the present disclosure. The APP comprises executable instructions configured to be executed on an auxiliary device to implement a user interface for a hearing aid or a hearing system described above in the 'detailed description of embodiments', and in the claims. The APP may be configured to run on cellular phone, e.g. a smartphone, or on another portable device allowing communication with said hearing aid or said hearing system.

The APP may e.g. be configured to select a target direction to a target sound source of current interest to a user of the hearing aid or hearing system. The APP may e.g. be configured to configure the hearing aid or the hearing system.

Embodiments of the disclosure may e.g. be useful in applications such as hearing aids or hearing aid systems.

BRIEF DESCRIPTION OF DRAWINGS

The aspects of the disclosure may be best understood from the following detailed description taken in conjunction with the accompanying figures. The figures are schematic and simplified for clarity, and they just show details to improve the understanding of the claims, while other details are left out. Throughout, the same reference numerals are used for identical or corresponding parts. The individual features of each aspect may each be combined with any or all features of the other aspects. These and other aspects, features and/or technical effect will be apparent from and elucidated with reference to the illustrations described hereinafter in which:

FIG. 1A illustrates a use to pick up the voice of a specific person, where the microphone unit e.g. is attached to a shirt of the specific person; and FIG. 1B illustrates a use to pick up sound from a multitude of directions, where the microphone unit is placed at a table, FIG. 2B illustrating a situation where the attachment element is not in use, do that the two parts of the clip are connected, and the switch is hence turned on, FIG. 3A, 3B, 3C shows different attachment element configurations, FIG. 3A illustrating an on-configuration (or closed state);

The figures are schematic and simplified for clarity, and they just show details which are essential to the understanding of the disclosure, while other details are left out. Throughout, the same reference signs are used for identical or corresponding parts.

Further scope of applicability of the present disclosure will become apparent from the detailed description given hereinafter. However, it should be understood that the detailed description and specific examples, while indicating preferred embodiments of the disclosure, are given by way of illustration only. Other embodiments may become apparent to those skilled in the art from the following detailed description.

DETAILED DESCRIPTION OF EMBODIMENTS

The detailed description set forth below in connection with the appended drawings is intended as a description of various configurations. The detailed description includes specific details for the purpose of providing a thorough understanding of various concepts. However, it will be apparent to those skilled in the art that these concepts may be practiced without these specific details. Several aspects of the apparatus and methods are described by various blocks, functional units, modules, components, circuits, steps, processes, algorithms, etc. (collectively referred to as "elements"). Depending upon particular application, design constraints or other reasons, these elements may be implemented using electronic hardware, computer program, or any combination thereof.

The electronic hardware may include micro-electronic-mechanical systems (MEMS), integrated circuits (e.g. application specific), microprocessors, microcontrollers, digital signal processors (DSPs), field programmable gate arrays (FPGAs), programmable logic devices (PLDs), gated logic, discrete hardware circuits, printed circuit boards (PCB) (e.g.

flexible PCBs), and other suitable hardware configured to perform the various functionality described throughout this disclosure, e.g. sensors, e.g. for sensing and/or registering physical properties of the environment, the device, the user, etc. Computer program shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The present application relates to the field of hearing aids, in particular to an assistive sound pick-up device external to the hearing aid, specifically to a hearing assistive device (e.g. a microphone unit) comprising a multitude of microphones, e.g. a microphone array.

Figure 1B:
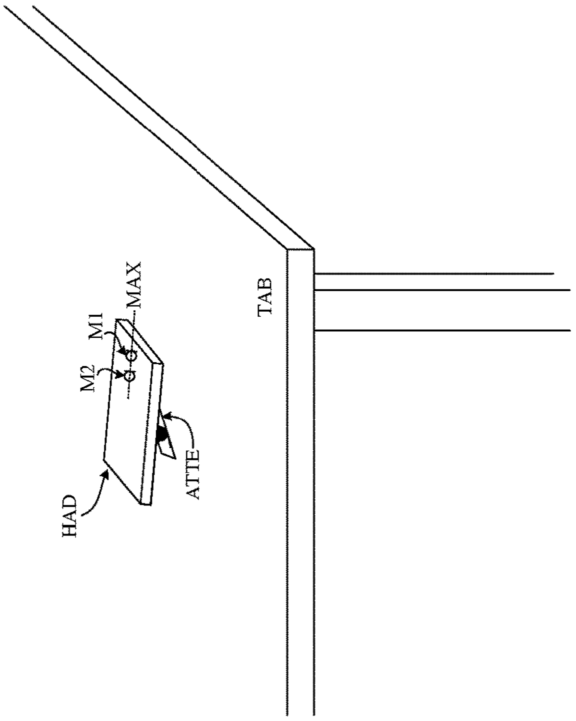
FIG. 1A, 1B shows a microphone unit used for two different purposes.
Figure 1A:
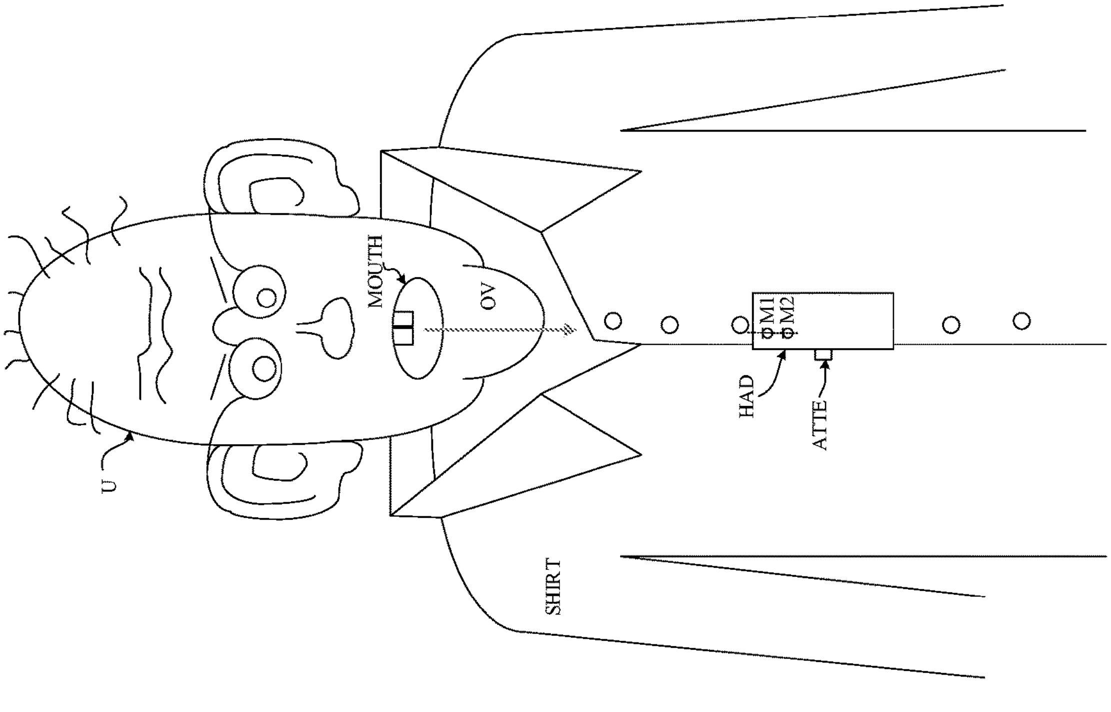

FIG. 1A, 1B shows a hearing assistive device, e.g. a microphone unit, used for two different purposes.

FIG. 1A illustrates a use to pick up the voice of a specific person, where the microphone unit e.g. is attached to a shirt of the specific person.

FIG. 1B illustrates a use to pick up sound from a multitude of directions, where the microphone unit is placed at a table.

Figure 2A:
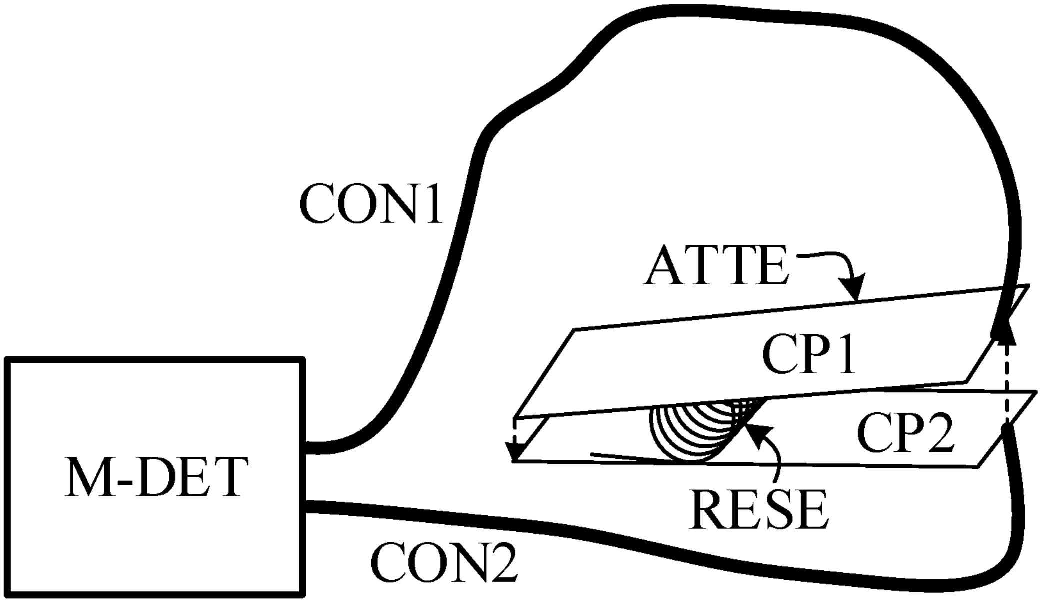
FIG. 2A, 2B shows embodiments of a microphone unit comprising an attachment element (e.g. a shirt clip) according to the present disclosure, where the attachment is configured to be used as a switch, FIG. 2A illustrating a situation where the attachment element is attached to some clothes (e.g. a shirt), in which case there is no conduction between the two parts of the clip (e.g if a piece of cloth separates the two parts) and where the switch is hence turned off.
Figure 2B:
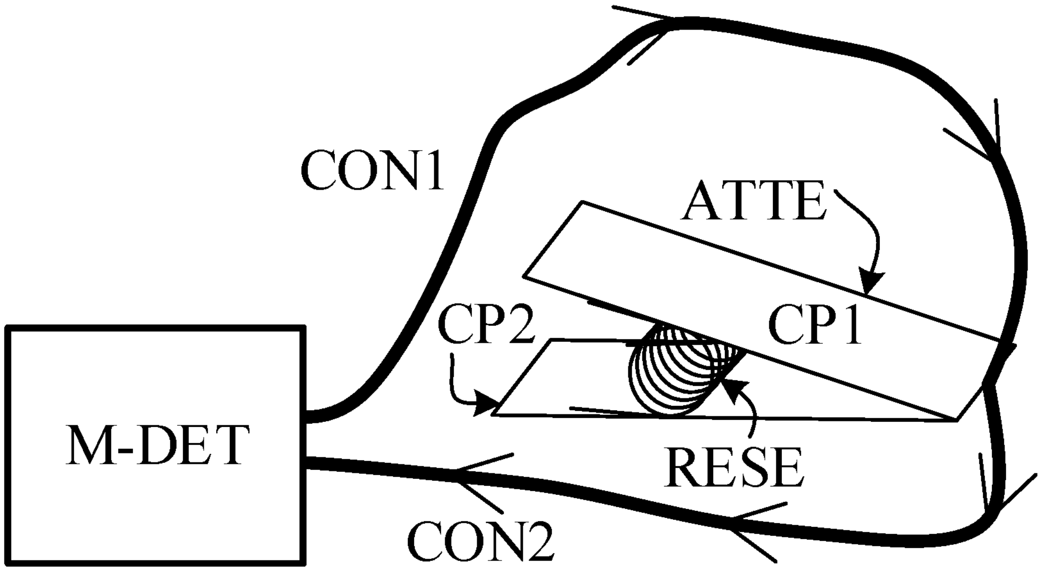

FIG. 2A, 2B shows a microphone unit comprising an attachment element (e.g. a shirt clip) according to the present disclosure, where the attachment element is configured to be used as a switch.

FIG. 2A illustrates a situation where the attachment element is attached to some clothes (e.g. a shirt), in which case there is no conduction between the two parts of the clip (e.g. if a piece of (non-conducting) cloth separates the two parts) and where the switch is hence turned off.

FIG. 2B illustrates a situation where the attachment element is not in use, so that the two parts of the clip are connected, and the switch is hence turned on. Each part of the clip may e.g. be connected to a wire as illustrated by the bold connections to the block PRO, e.g. a processor comprising a mode selector for selecting a mode of operation of the microphone unit, e.g. a directional mode in FIG. 2A and an omni-directional mod in FIG. 2B.

FIGS. 2A and 2B illustrates an embodiment of an attachment element according to the present disclosure in the form of a clip wherein the clip is used as a switch. When the clip is attached e.g. to a shirt, the two parts of the clip are disconnected (FIG. 2A). Contrary, if the clip (i.e. the microphone unit including the clip) is placed at a table, the two parts of the clip are connected. The clip can thus be used as a switch, where conduction between the two parts of the clip can be switched on or off.

We therefore propose to change processing based on the clip microphone switch. Preferably, the clip microphone array switches between a directional beampattern, when the clip is turned off (shirt mode), and an omni-directional beampattern when the clip is turned on (table mode).

Also, the frequency response of the processed signal may change based on the different modes.

An advantage over a manual switch (such as a pushbutton) is that the user automatically turns the switch on or off based on its intended use.

Further, in case the microphone unit is used to pick up sound from a specific talker (or from a specific direction), a directional mode of the microphone unit can be activated by inserting a piece of non-conductive material between the electrically conductive parts (or elements) of the clip and pointing the microphone unit in the specific direction.

Figure 3A:
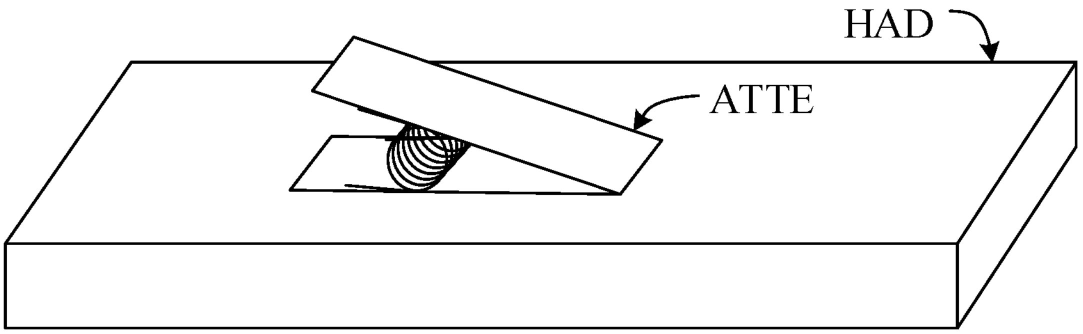
FIG. 3B illustrating an off-configuration (or open state) in a first orientation.
FIG. 3C illustrating an on-configuration (or closed state) in a second orientation.
Figure 3B:
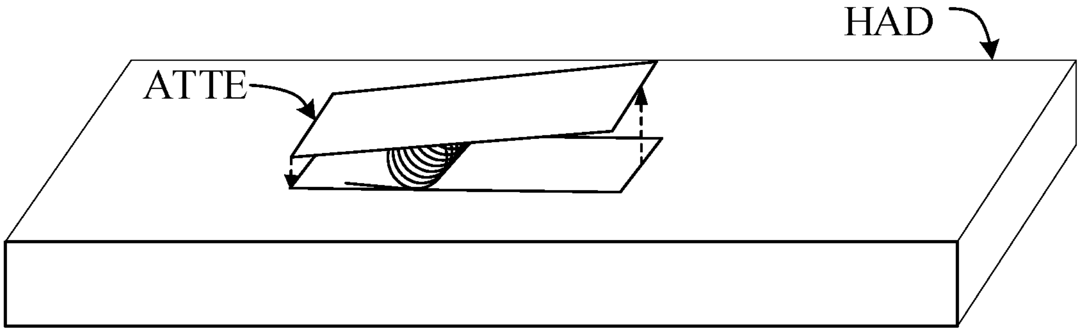
Figure 3C:
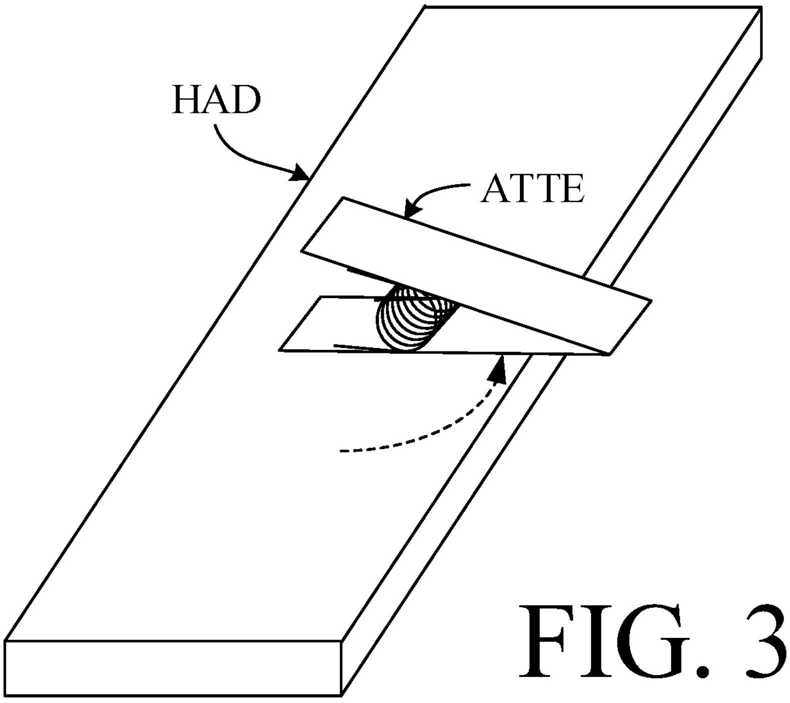

FIG. 3A, 3B, 3C shows different attachment element configurations. The attachment element (ATTE) has the form of a clip comprising mutually movable first and second mechanical parts allowing the clip to grip and thereby to be attached to an item. The mutually movable first and second mechanical parts comprise respective first and second electrically conducting elements. The first and second mutually movable mechanical parts and hence the first and second electrically conductive elements are configured to be spatially separated from each other in the first, open, state and to be electrically connected in the second, closed, state, respectively. In other words, the first, open, and second, closed, states may be configured to implement an electric switch. The first, open state may implement an electrical OFF state (e.g. a logic zero). The second, closed state may implement an electrical ON state (e.g. a logic one).

FIG. 3A illustrates an ON-configuration (or closed state).

FIG. 3B illustrates an OFF-configuration (or open state) in a first orientation of the attachment element (ATTE) relative to a housing of the hearing assistive device (HAD), and FIG. 3C illustrating an ON-configuration (or closed state) in a second orientation of the attachment element (ATTE) relative to a housing of the hearing assistive device (HAD).

Figure 4:
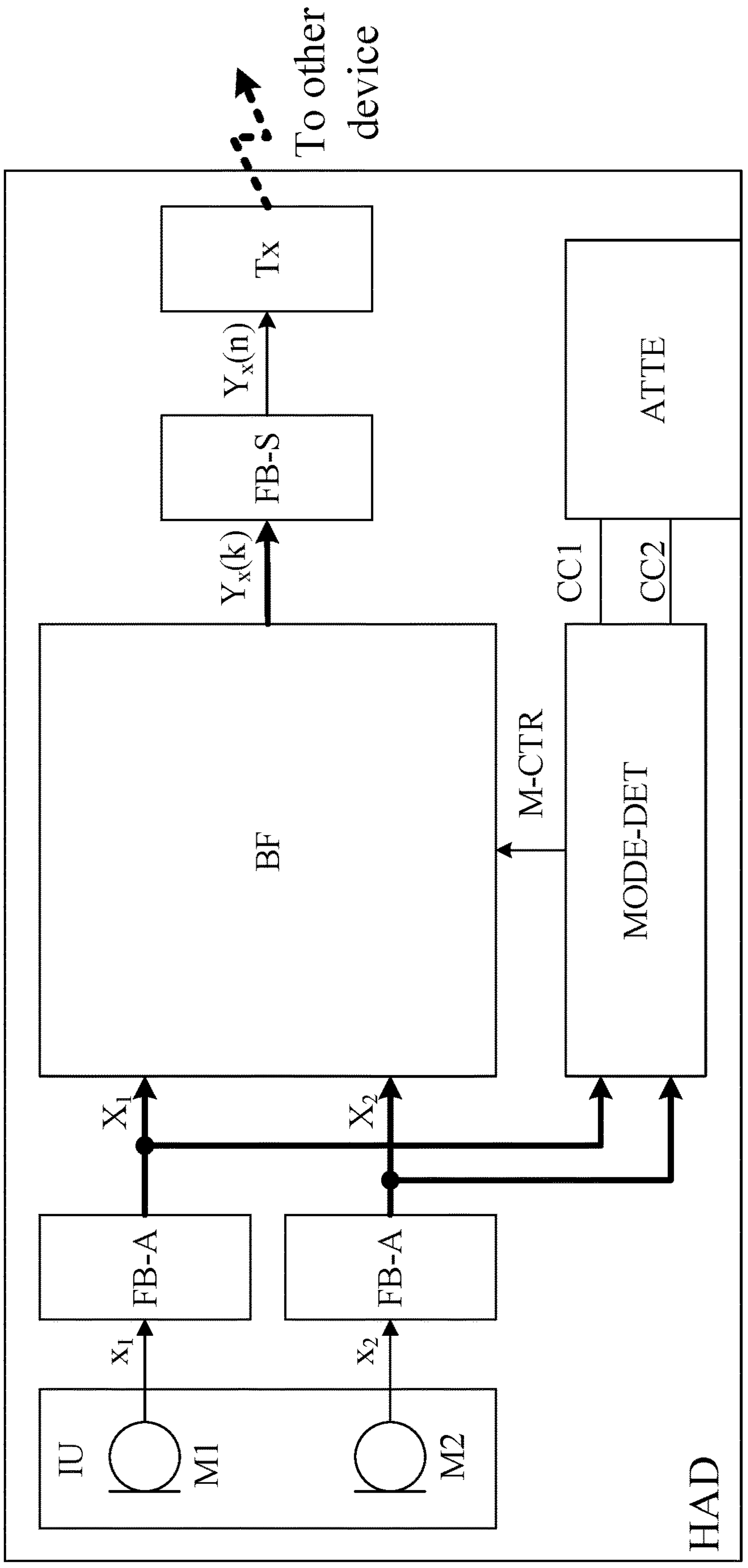
FIG. 4 shows a block diagram of an embodiment of a hearing assistive device according to the present disclosure.

FIG. 4 shows a block diagram of an embodiment of a hearing assistive device according to the present disclosure. The hearing assistive device (HAD) comprises a multi-microphone system for providing a processed input signal ($Y_x(k)$, k being a frequency index). The multi-microphone system comprises an input unit (IU) comprising a multitude of microphones (M1, M2), here two, for picking up sound from an environment of the hearing assistive device. Each of the multitude of microphones provides an electric input signal ($x_1$, $x_2$) (in the time-domain) representing the sound. The multi-microphone system further comprises a beamformer filter (BF) configured to receive the electric input signals ($x_1$, $x_2$), or signals originating therefrom, here signals ($X_1$, $X_2$) in the (time-)frequency domain (k, m), k and m being frequency and time indices, respectively. The hearing assistive device (HAD) comprises respective analysis filter banks (FB-A) providing signals ($X_1$, $X_2$) in the (time-)frequency domain (k, m) based on respective time-domain signals ($x_1$, $x_2$) from the microphones (M1, M2). The beamformer filter (BF) is further configured to provide a spatially filtered signal ($Y_x(k)$) in dependence of the electric input signals ($X_1$, $X_2$) and fixed or adaptively determined beamformer weights (see e.g. (W) in FIG. 6C). The hearing assistive device (HAD) further comprises an attachment element (ATTE) configured to fix the hearing assistive device to the body or clothes of a user of the hearing assistive device. The attachment element (ATTE) is configured to be in different first, open and second, closed states (see e.g. FIGS. 2A and 2B, respectively). The multi-microphone system is configurable to operate in at least two modes in dependence of a mode control signal (M-CTR). The at least two modes comprise a) a directional mode wherein the multi-microphone system is configured to provide the processed input signal as a substantially directional signal ($Y_x(k)$); and b) an omni-directional mode wherein the multi-microphone system is configured to provide the processed input signal a substantially omni-directional signal. The attachment element (ATTE) is configured to provide an electric signal (CC1, CC2) indicative of a current state of the attachment element. The hearing assistive device (HAD) further comprises a mode controller (M-DET) for providing the mode control signal (M-CTR) in dependence of the electric signal(s) (CC1, CC2) indicative of a current state of the attachment element.

The attachment element (ATTE) may in the first, open state e.g. be configured to be attached to clothing. The clothing may e.g. be clothing worn by the user that are intended to wear the hearing assistive device (HAD), cf. e.g. the user (U) in FIG. 1A, 6A. The attachment element (ATTE) may in the second, closed state be configured to be un-attached to clothing, e.g. not be attached to any substrate or carrier. The attachment element may in the second, closed state e.g. be lying on a substrate or carrier, e.g. a table (cf. FIG. 1B, 6B). The attachment element (ATTE) may e.g. comprise first and second electrically conductive elements (cf. CP1, CP2, in FIG. 2A, 2B) configured to be spatially separated from each other in the first, open state (FIG. 2) and to be electrically connected in the second, closed state (FIG. 2B), respectively. The mode controller (M-DET) may be configured to provide that the mode control signal (M-CTR) is indicative of a) a directional mode of operation of the multi-microphone system when the attachment element (ATTE) is in the first, open state (FIG. 2A) and b) an omni-directional mode of operation of the multi-microphone system when the attachment element (ATTE) is in the second, closed state (FIG. 2B).

The hearing assistive device (HAD) further comprises a synthesis filter bank (FB-S) converting the processed input signal ($Y_x(k)$) in the time-frequency domain (time index m not indicated) a processed signal ($Y_x(n)$) in the time-domain, n being a time index. The hearing assistive device (HAD) further comprises a transmitter (Tx) configured to transmit the processed input signal (or a further processed version thereof) to another device, (cf. zig-zag arrow denoted 'To other device'), e.g. to the hearing aid (HD) (or to a communication device, in case the hearing assistive device (HAD) is used for picking a hearing aid wearers' own voice, e.g. in a telephone mode of operation (or in a keyword detection application).

Figure 5:
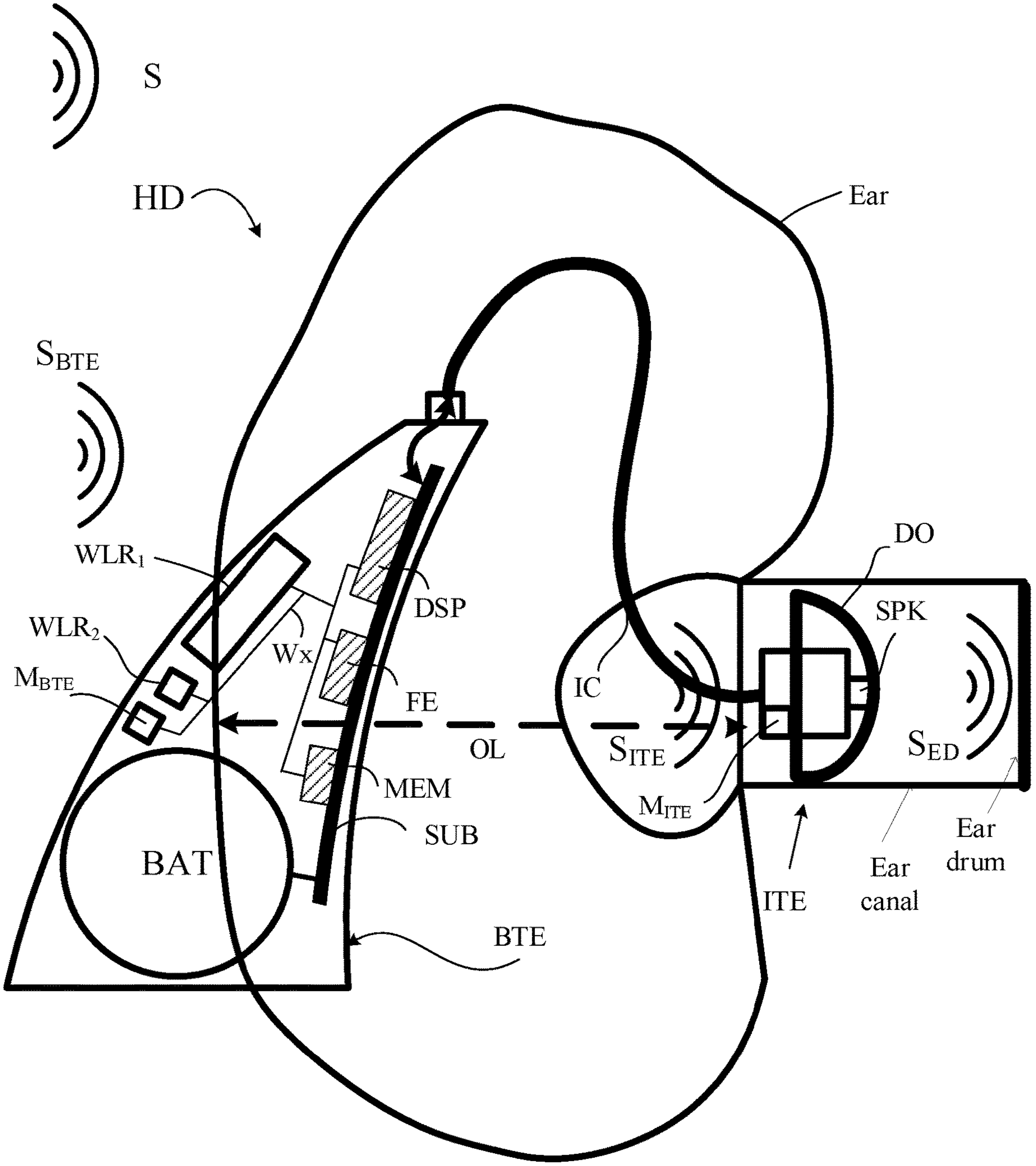
FIG. 5 shows a hearing aid according to an embodiment of the present disclosure.

FIG. 5 shows a hearing aid according to an embodiment of the present disclosure.

FIG. 5 shows an embodiment of a hearing device, e.g. a hearing aid, according to the present disclosure comprising a BTE-part as well as an ITE-part. FIG. 5 shows an embodiment of a hearing aid comprising at least two input transducers, e.g. microphones, located in a BTE-part and/or in an ITE-part. The BTE-part (BTE) is adapted for being located at or behind an ear of a user and the ITE-part (ITE) is adapted for being located in or at an ear canal of a user's ear. The BTE-part and the ITE-part are connected (e.g. electrically connected) by a connecting element (IC) and internal wiring in the ITE- and BTE-parts (cf. e.g. schematically illustrated as wiring Wx in the BTE-part). The BTE- and ITE-parts may each comprise an input transducer, e.g. a microphone ($M_{BTE}$ and $M_{ITE}$), respectively, which are used to pick up sounds from the environment of a user wearing the hearing device, and—in certain modes of operation—to pick up the voice of the user. The ITE-part may comprise a mould intended to allow a relatively large sound pressure level to be delivered to the ear drum of the user (e.g. a user having a severe-to-profound hearing loss). An output transducer, e.g. a loudspeaker, may be located in the BTE-part and the connecting element (IC) may comprise a tube for acoustically propagating sound to an ear mould and through the ear mould to the eardrum of the user.

The hearing aid (HD) comprises an input unit comprising two or more input transducers (e.g. microphones) (each for providing an electric input audio signal representative of an input sound signal). The input unit further comprises two (e.g. individually selectable) wireless receivers ($WLR_1$, $WLR_2$) for providing respective directly received auxiliary audio input and/or control or information signals. The BTE-part comprises a substrate SUB whereon a number of electronic components (MEM, FE, DSP) are mounted. The BTE-part comprises a configurable signal processor (DSP) and memory (MEM) accessible therefrom. In an embodiment, the signal processor (DSP) form part of an integrated circuit, e.g. a (mainly) digital integrated circuit, whereas the front-end chip (FE) comprises mainly analogue circuitry and/or mixed analogue digital circuitry (including interfaces to microphones and loudspeaker).

The hearing aid (HD) comprises an output transducer (SPK) providing an enhanced output signal as stimuli perceivable by the user as sound based on an enhanced audio signal from the signal processor (DSP) or a signal derived therefrom. Alternatively or additionally, the enhanced audio signal from the signal processor (DSP) may be further processed and/or transmitted to another device depending on the specific application scenario.

In the embodiment of a hearing device in FIG. 5, the ITE part comprises the output transducer in the form of a loudspeaker (sometimes termed 'receiver') (SPK) for converting an electric signal to an acoustic signal. The ITE-part of the embodiments of FIG. 5 also comprises an input transducer ($M_{ITE}$, e.g. a microphone) for picking up a sound from the environment. The input transducer ($M_{ITE}$, and to a lesser extent $M_{BTE}$) may—depending on the acoustic environment—pick up more or less sound from the output transducer (SPK) (unintentional acoustic feedback). The ITE-part further comprises a guiding element, e.g. a dome or mould or micro-mould (DO) for guiding and positioning the ITE-part in the ear canal (Ear canal) of the user.

In the scenario of FIG. 5, a (far-field) (target) sound source S is propagated (and mixed with other sounds of the environment) to respective sound fields $S_{BTE}$ at the BTE microphone ($M_{BTE}$) of the BTE-part and Sim at the ITE microphone ($M_{ITE}$) of the ITE-part, and $S_{ED}$ at the ear drum (Ear drum)

The hearing aid (HD) exemplified in FIG. 5 represent a portable device and further comprises a battery (BAT), e.g. a rechargeable battery, for energizing electronic components of the BTE- and ITE-parts.

In an embodiment, the hearing aid (HD) (e.g. the processor (DSP)) is adapted to provide a frequency dependent gain and/or a level dependent compression and/or a transposition (with or without frequency compression) of one or frequency ranges to one or more other frequency ranges, e.g. to compensate for a hearing impairment of a user.

The hearing aid of FIG. 5 contains two input transducers ($M_{BTE}$ and $M_{ITE}$), e.g. microphones, one ($M_{ITE}$, in the ITE-part) is located in or at the ear canal of a user and the other ($M_{BTE}$, in the BTE-part) is located elsewhere at the ear of the user (e.g. behind the ear (pinna) of the user), when the hearing device is operationally mounted on the head of the user. In the embodiment of FIG. 5, the hearing aid may be configured to provide that the two input transducers ($M_{BTE}$ and $M_{ITE}$) are located along a substantially horizontal line (OL) when the hearing device is mounted at the ear of the user in a normal, operational state (cf. e.g. input transducers $M_{BTE}$, $M_{ITE}$ and double arrowed, dashed line OL in FIG. 5). This has the advantage of facilitating beamforming of the electric input signals from the input transducers in an appropriate (horizontal) direction, e.g. in the 'look direction' of the user (e.g. towards a target sound source). The microphones may alternatively be located so that their axis points towards the user's mouth. Or, a further microphone may be included to provide such microphone axis together with one of the other microphones, to thereby improve the pick-up of the wearer's voice. Alternatively, at least one of the BTE microphones may be located such that the BTE and the ITE microphone and the mouth of the user are located along a line (when seen from the side).

Figure 6A:
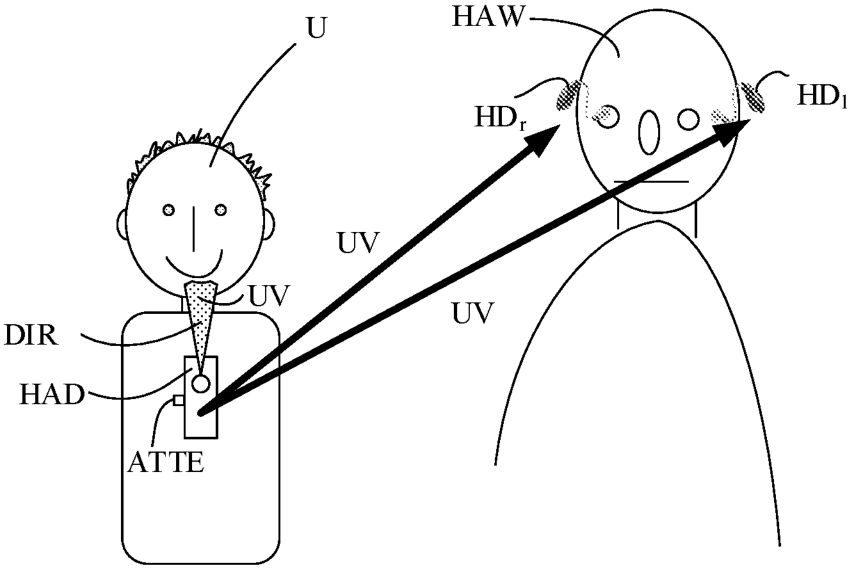
FIG. 6A shows a hearing system comprising a hearing assistive device and a hearing aid in a first, directional mode of operation according to the present disclosure.
Figure 6B:
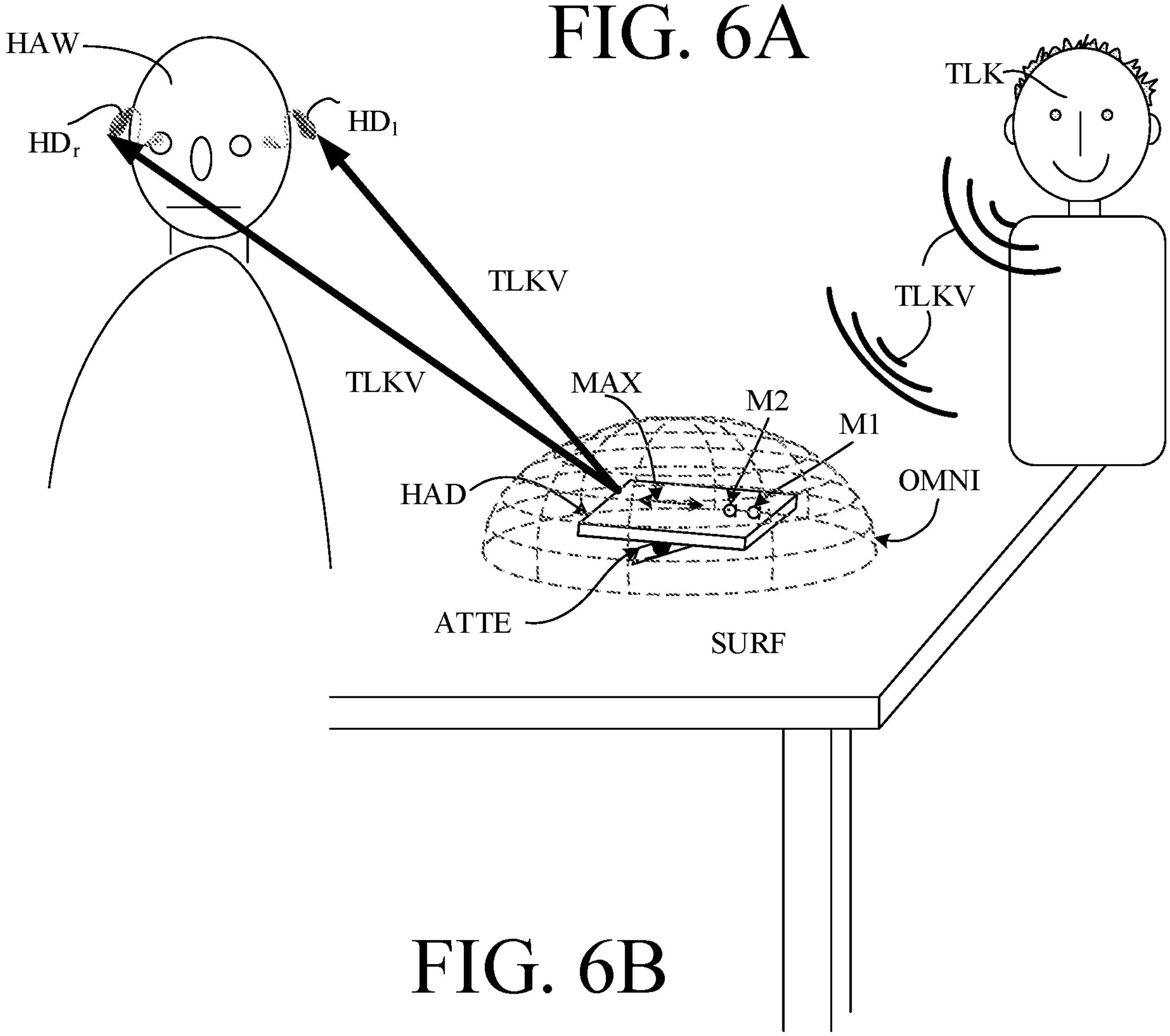
FIG. 6B shows a hearing system comprising a hearing assistive device and a hearing aid in a second, omni-directional mode of operation according to the present disclosure.
Figure 6C:
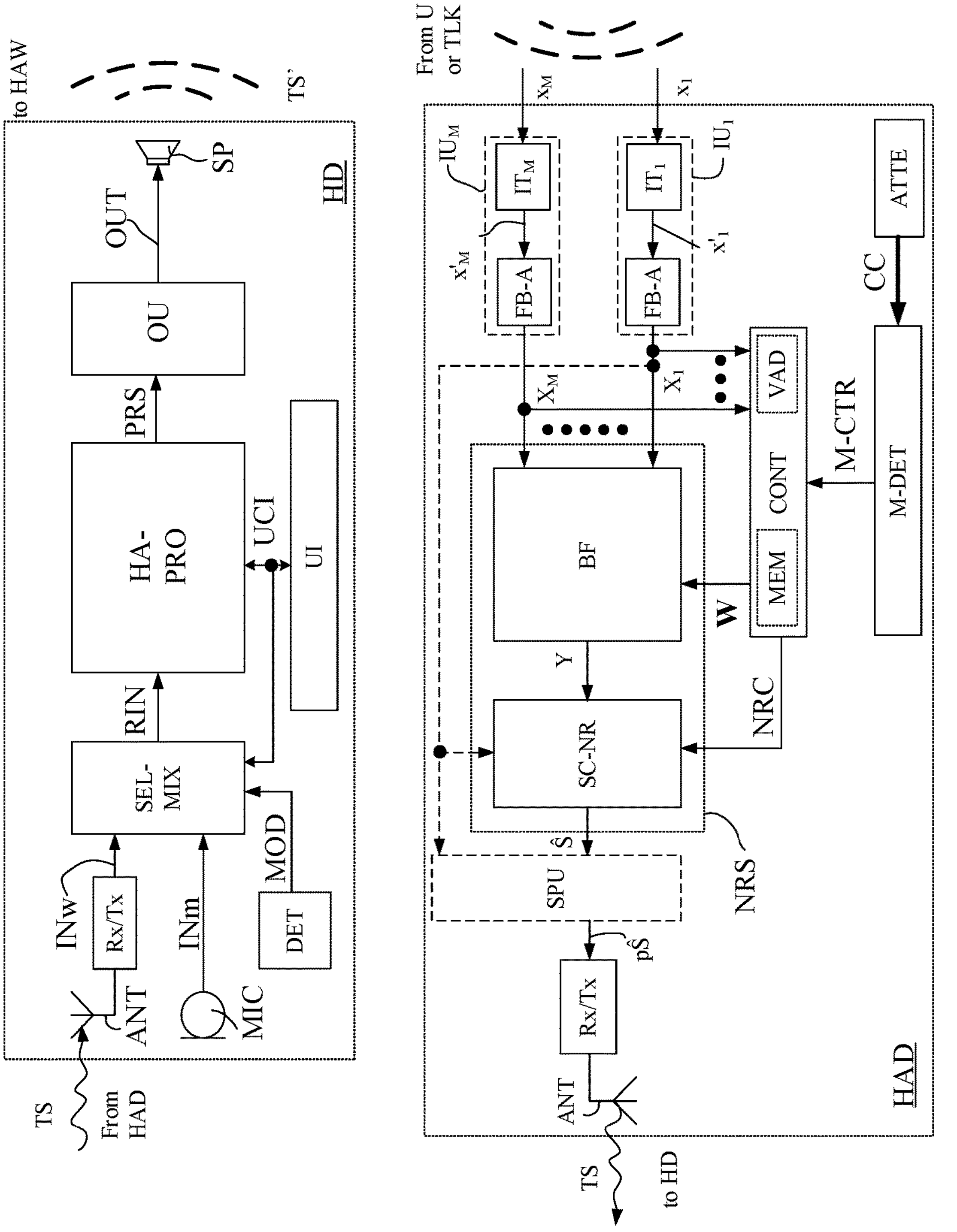
FIG. 6C shows a block diagram of an embodiment of a hearing system comprising a hearing assistive device and a hearing aid according to the present disclosure.

FIG. 6A shows a hearing system comprising a hearing assistive device and a hearing aid in a first, directional mode of operation according to the present disclosure. FIG. 6B shows a hearing system comprising a hearing assistive device and a hearing aid in a second, omni-directional mode of operation according to the present disclosure. FIG. 6C shows a block diagram of an embodiment of a hearing system comprising a hearing assistive device and a hearing aid according to the present disclosure.

FIG. 6A shows an exemplary use scenario of a hearing system according to the present disclosure comprising a hearing assistive device (HAD, used as a partner microphone unit) worn by a communication partner (e.g. a person speaking) and a pair of (left and right) hearing aids ($HD_l$, $HD_r$) worn by a hearing aid user (HAW). The left and right hearing aids (e.g. forming part of a binaural hearing aid system) are worn by the hearing aid user (HAW) at left and right ears, respectively. The hearing assistive device (HAD) is worn by a communication partner or a speaker (TLK), whom the user wishes to engage in discussion with and/or listen to. The hearing assistive device (HAD) may be a device worn by a person (U) that at a given time only intends to communicate with the hearing aid user (HAW). In a particular scenario, the hearing assistive device (HAD) may form part of a larger system (e.g. a public address system), where the speaker's voice is transmitted to the hearing aid user (HAW) (and possibly to other users of hearing devices, and/or possibly acoustically broadcast via loudspeakers as well). The hearing assistive device (HAD) according to the present disclosure may be used in either situation. The multi-input microphone system of the hearing assistive device (HAD) is configured to focus on the target sound source (the voice of the wearer of the hearing assistive device (HAD)) and hence direct its sensitivity towards its wearer's mouth, cf. (ideally) cone-formed beam (DIR) from the hearing assistive device (HAD) to the mouth of the speaker (U) (cf. also microphone direction, MAX). The target signal (UV) thus picked up is transmitted to the left and right hearing devices ($HD_l$, $HD_r$) worn by the hearing aid user (HAW). In the scenario of FIG. 6A, the hearing assistive device (HAD) is in a directional mode of operation controlled by the attachment element (ATTE), e.g. a 'shirt clip', e.g. being attached to clothing of the person (user, U) wearing the hearing assistive device (HAD), as e.g. described in connection with FIG. 2A, where the attachment element (ATTE) is in an open state.

The hearing system is configured to allow an audio link to be established between the hearing assistive device (HAD) and the left and right hearing aids ($HD_l$, $HD_r$). The hearing assistive device (HAD) comprises antenna and transceiver circuitry to allow (at least) the transmission of audio signals, and the left and right hearing aid ($HD_l$, $HD_r$) comprises antenna and transceiver circuitry to allow (at least) the reception of audio signals (DIRS) from the hearing assistive device (HAD). This link may e.g. be based on far-field communication, e.g. according to a standardized (e.g. Bluetooth or Bluetooth Low Energy) or proprietary scheme (e.g. Ultra WideBand (UWB). The solid arrows (denoted UV) from the hearing assistive device (HAD) to the respective hearing aids ($HD_l$, $HD_r$) indicate the path of a wirelessly transmitted audio signal (UV) containing the voice (UV) of the person (U) wearing the hearing assistive device (HAD). Alternatively or additionally, the link between the hearing assistive device and the hearing aid may be based on near-filed communication, e.g. inductive communication as is well known in the art to be economic in power consumption (but at the cos of a relatively low operational range, e.g. ≤0.5 m), and thus preferably used in scenarios where the hearing assistive device and the hearing aid are worn by the same person.

In another—omni-directional—mode of operation, the hearing assistive device (HAD) is configured to pick up the voice (TLKV) of a person or persons (TLK) being in the immediate environment of the hearing assistive device (HAD). This is illustrated in FIG. 6B.

FIG. 6B shows an exemplary use scenario of a hearing system according to the present disclosure comprising a hearing assistive device (HAD, used as a 'table microphone' and a pair of (left and right) hearing aids ($HD_l$, $HD_r$) worn by a hearing aid user (HAW). In FIG. 6B, the hearing assistive device (HAD) is placed on a support structure (SURF), e.g. at a table, in order to pick up voices from persons sitting or otherwise located near the support structure (e.g. around the table). In that situation, a directional microphone mode may unintentionally attenuate some voices of interest. Hence, an omni-directional microphone sensitivity is preferred (cf. semi-spherical beampattern 'OMNI' in FIG. 6B). In the scenario of FIG. 6B, the hearing assistive device (HAD) is in an omni-directional mode of operation controlled by the attachment element (ATTE), as e.g. described in connection with FIG. 2B, where the attachment element (ATTE) is in a closed state. In the omni-directional mode, the hearing assistive device (HAD) picks up sound from any sound source in its immediate environment, here from talker (TLK) whose voice (TLKV) is transmitted to the respective hearing aids ($HD_l$, $HD_r$) (as indicated by the solid arrows (denoted TLKV) from the hearing assistive device (HAD) to the respective hearing aids ($HD_l$, $HD_r$).

The hearing assistive device (HAD) of FIG. 6A, 6B is a hearing assistive device according to the present disclosure, e.g. as described in connection with FIG. 4. The left and right hearing aids of FIG. 6A, 6B may e.g. be hearing aids as described in connection with FIG. 5 (or any other hearing aid adapted to communicate with the hearing assistive device (HAD)). The hearing system illustrated in FIGS. 6A and 6B is a hearing system according to the present disclosure and may e.g. be the embodiment of hearing system as described in FIG. 6C.

FIG. 6C shows a hearing system comprising a hearing aid (HD) adapted for being located at or in an ear of a user, or adapted for being fully or partially implanted in the head of the user, and a separate hearing assistive device (HAD), e.g. either used as partner microphone unit, or as a table microphone unit (as e.g. described in connection with FIG. 6A, 6B).

The hearing assistive device (HAD) comprises a multitude M of input units $IU_i$, i=1, 2, . . . , M, each being configured for picking up a signal $x_i$ (i=1, 2, . . . , M) representative of a sound (e.g. UV, TLKV) from the environment of the hearing assistive device (HAD) (ideally from the user U, cf. FIG. 6A or a talker (TLK), cf. FIG. 6B, as indicated in FIG. 6C by sound denoted 'From U or TLK'). The multitude M of input units $IU_i$, i=1, 2, . . . , M are configured to provide corresponding electric input signals $X_i$ in a time-frequency representation (e.g. comprising a number of frequency (sub-)bands and a number of time instances. M is larger than or equal to two. In the embodiment of FIG. 6C, input units $IU_1$-$IU_M$ are shown to comprise respective input transducers $IT_1$-$IT_M$ (e.g. microphones) for converting input sound $x_1$-$x_M$ to respective (e.g. digitized) electric input signals $x'_1$-$x'_M$ and each their analysis filter banks (FB-A) for converting electric (time-domain) input signals $x'_1$-$x'_M$ to respective electric input signals $X_1$-$X_M$ in said time-frequency representation (k, m), where k is a frequency index, and m is a time index. All M input units may be identical to $IU_1$ and $IU_M$ or may be individualized, e.g. to comprise individual normalization or equalization filters and/or wired or wireless transceivers. In an embodiment, one or more of the input units comprises a wired or wireless transceiver configured to receive an audio signal from another device, allowing to provide inputs from input transducers spatially separated from the hearing assistive device (HAD), e.g. from one or more microphones of one or more hearing devices (HD) (or from another hearing assistive device). The time-frequency domain input signals ($X_i$, i=1, 2, . . . , M) are fed to a control unit (CONT) and to a multi-input noise reduction system (NRS) for providing an estimate S of a target signal s comprising the voice (UV) of the wearer (U) of the hearing assistive device (HAD) or from one or more sound sources (e.g. the voice (TLKV) of a talker (TLK)) around the hearing assistive device (HAD). The multi-input noise reduction system (NRS) comprises a multi-input beamformer filtering unit (BF) operationally coupled to the multitude of input units $IU_i$, i=1, . . . , M, and configured to determine (or apply) filter weights w (k, m) for providing a beamformed signal Y.

In a directional mode of operation (cf. FIG. 6A), the appropriate filter coefficients (W) are applied to beamformer filtering unit (BF) thereby providing a beamformed signal Y, wherein signal components from other directions than a direction (e.g. the microphone direction (MAX)) of a target signal source (e.g. the user's voice (UV) in the scenario of FIG. 6A) are attenuated, whereas signal components from the direction of the target signal source are left un-attenuated or are attenuated less relative to signal components from other directions.

In an omni-directional mode of operation (cf. FIG. 6A), the appropriate filter coefficients (W) are applied to beamformer filtering unit (BF) thereby providing a an omni-directional signal Y. Alternatively, one of the microphone signals ($X_1$-$X_M$), e.g. $X_1$ as illustrated in FIG. 6C by dashed arrow, may be used instead of the beamformed signal (Y) for (optional further processing in signal processing unit (SPU) and) transmission to the hearing aid (HD, or hearing aids ($HD_l$, $HD_r$).

The multi-channel noise reduction system (NRS) of the embodiment of FIG. 6C further (optionally) comprises a single channel noise reduction unit (SC-NR) operationally coupled to the beamformer filtering unit (BF) and configured for reducing residual noise in the beamformed signal Y and providing the estimate S of the target signal (the user's voice (UV) or the talker's voice (TLK), cf. FIGS. 6A and 6B, respectively). In the omni-directional mode, if one of the microphone signals (here $X_1$) is used as the omni-directional target signal, it may be fed (as indicated in FIG. 6C by dashed arrow) to the single channel noise reduction block (SC-NR) for further noise reduction.

The hearing assistive device (HAD) may further comprise a signal processing unit (SPU, dashed outline) for further processing the estimate S of the target signal and provide a further processed signal $p\hat{S}$. The hearing assistive device (HAD) further comprises antenna and transceiver circuitry ANT, RF-Rx/Tx) for transmitting said estimate $\hat{S}$ (or further processed signal $p\hat{S}$) of the target signal to the hearing aid (HD, or hearing aids ($HD_l$, $HD_r$). The transceiver unit (or the signal processing unit) may comprise a synthesis filter bank (cf. e.g. FB-S in FIG. 4) to provide the estimate of the target signal as a time domain signal. Alternatively, the target signal may be transmitted as a time-frequency domain signal.

The hearing assistive device (HAD) comprises a control unit (CONT) configured to control the multi-input beamformer filtering unit (BF), e.g. to apply appropriate beamformer weights (W) to the beamformer filtering unit (BF) in dependence of a mode control signal (M-CTR) from the mode detector (M-DET). The provision of the mode control signal (M-CTR) by the mode detector (M-DET) in dependence of signals (CC) from the attachment element (ATT) is described in connection with FIG. 4.

The control unit (CONT) comprises a memory (MEM) storing values of beamformer weights $w_{ij}$, e.g. fixed or adaptively updated values, for the directional mode and the omni-directional mode of operation of the hearing assistive device (HAD).

The control unit (CONT) further comprises a voice activity detector (VAD) and/or is adapted to receive information (estimates) about current voice activity of the user (U, FIG. 6A) another talker (TLK, FIG. 6B) in the environment around the hearing assistive device (HAD). Voice activity information can e.g. be used to provide an adaptive noise reduction system (NRS) to control the timing of the update of the beamformer/noise reduction system (e.g. to update a steering vector d when the target signal is present (when the user or other target talker speaks), and to update a noise covariance matrix $R_{vv}$ when the user (or other target talker) does not speak). The control unit may provide a noise reduction control signal (NRC) to control single channel noise reduction unit (SC-NR).

In case the hearing assistive device (HAD) is worn by the hearing aid wearer (HAW), the hearing assistive device (HAD) (e.g. the control unit (CONT)) may be configured (in a specific processing mode of operation) to transmit the noise control signal (NRC), e.g. comprising noise reduction parameters for controlling the adaptive noise reduction system (NRS), to the hearing aid (HD, or hearing aids ($HD_l$, $HD_r$). The specific processing mode of operation may e.g. comprise a situation, where the hearing aid needs 'help', e.g. in complex acoustic environments (and optionally where the hearing assistive device (HAD) and the hearing aid (HD) are closer to each other than a threshold distance, e.g. 0.5 m). If the hearing assistive device comprises an adaptive noise reduction system (NRS) similar to the system of the hearing assistive device (HAD), the noise reduction parameters determined in the hearing assistive device (HAD) (having more processing power than the hearing aid) may be used directly in the hearing aid.

The hearing aid (HD in FIG. 6C) comprises an input transducer, e.g. microphone (MIC), for converting an input sound to an electric input signal INm. The hearing aid may comprise two or more input transducers, each adapted to convert an input sound to an electric input signal (INm1, INm2, . . . ). The hearing device may comprise a directional microphone system (e.g. a multi-input beamformer as discussed in connection with the hearing assistive device (HAD, cf. e.g. BF in FIG. 4 and FIG. 6C) adapted to enhance a target acoustic source among a multitude of acoustic sources in the local environment of the user (HAW) wearing the hearing device (HD). Such target signal (for the hearing device) is typically NOT the user's own voice.

The hearing aid (HD) comprises a transceiver unit (e.g. ANT, Rx/Tx) for establishing a wireless link to the hearing assistive device (HAD), in particular for providing an audio signal (INw) received from the hearing assistive device (HAD) (and/or from another device), e.g. comprising the voice of a person (U, TLK) in the environment around the hearing aid wearer (HAW). The transceiver circuitry (ANT, Rx/Tx) may comprise appropriate demodulation circuitry for demodulating the received direct electric input, e.g. to provide the direct electric input signal INw representing an audio signal (and/or a control signal).

The hearing aid (HD) further comprises a selection and/or mixing unit (SEL-MIX) allowing to select one of the electric input signals (INw, INm) or to provide an appropriate mixture as a resulting input signal RIN. The selection and/or mixing unit (SEL-MIX) is controlled by detection and control unit (DET) via signal MOD determining a mode of operation of the hearing aid (in particular controlling the SEL-MIX-unit). The detection and control unit (DET) may e.g. comprise a detector for identifying the mode of operation (e.g. for detecting that the user wishes to receive an audio signal from the hearing assistive device (HAD) (=>'Listening mode'), or wishes to engage in a telephone conversation (=>'telephone mode'). Alternatively or additionally, the hearing aid may be configured to receive such mode control information, e.g. from an external sensor and/or from a user interface (UI, via signal UC1 to the selection and/or mixing unit (SEL-MIX)).

The input signals INw and INm may be in the time domain or in the time-frequency domain, according to the particular application in the hearing device (HD).

The hearing aid further comprises an audio signal processor (HA-PRO) for processing the resulting input signal RIN and is e.g. adapted to provide a frequency dependent gain and/or a level dependent compression, e.g. to compensate for a hearing impairment of a user of the hearing aid. The signal processor (HA-PRO) provides a processed signal PRS. The hearing aid further comprises an output unit (OU) for providing a stimulus OUT configured to be perceived by the user as an acoustic signal based on a processed electric signal PRS. In the embodiment of FIG. 6C, the output transducer comprises a loudspeaker (SP) for providing the stimulus OUT as an acoustic signal to the hearing aid wearer (HAW) (here indicated by reference 'to HAW' and signal TS' (target signal) referring to the 'target signal' provided by the hearing assistive device (HAD) (or received from a communication device in a particular communication mode). The hearing aid (HD) may alternatively or additionally (to the loudspeaker) comprise a number of electrodes of a cochlear implant or a vibrator of a bone conducting hearing device.

In a specific communication mode of operation of the hearing system (e.g. a telephone mode), where the hearing assistive device (HAD) is worn by the hearing aid wearer (HAW) instead of a communication partner, the user's own voice may be picked up by the hearing assistive device (HAD) and transmitted to another device (e.g. to a communication device, e.g. a cellular telephone) via a transceiver unit (e.g. ANT, Rx/Tx of FIG. 6C or a separate transceiver unit) for establishing a wireless link between the hearing assistive device (HAD) and the other device. In such communication mode, the hearing device (HD) may be configured to wirelessly receive a direct electric input signal from another device (e.g. a communication device, e.g. a cellular telephone) via a transceiver unit (e.g. ANT, Rx/Tx of FIG. 6C or a separate transceiver unit) for establishing a wireless link between the hearing aid (HD) and the other device.

Alternatively, the communication mode (e.g. the telephone mode) may be implemented by using a microphone system of the hearing aid to pick up user's own voice (e.g. by a dedicated own voice beamformer) and to transmit the own voice estimate to the communication device (cellular telephone), and to receive an audio signal from the communication device, e.g. using a transceiver unit (e.g. ANT, Rx/Tx of FIG. 6C or a separate transceiver unit) for said audio transmission (own voice) and reception (far end voice).

In a further alternative, the hearing aid of a hearing system (e.g. a hearing system according to the present disclosure) may contain an own voice detector, which may be more reliable compared to an own voice detector in the hearing assistive device (e.g. a clip microphone) (during shirt mode) simply because the variation in placement of the hearing assistive device (e.g. clip microphone) is higher than the variation in the placement behind the ear. The own voice detection signal detected by the hearing aid(s) may thus be shared to the hearing assistive device and used by the hearing assistive device e.g. to update the (relative) own voice transfer function (OVTF) between mouth of a hearing aid wearer and the microphones of the hearing assistive device. This, however, addresses a third mode, where the hearing aid wearer is also wearing the hearing assistive device. In such a situation, where the hearing assistive device may be used as an extra microphone worn by the hearing aid user for further speech enhancement, the mode detection provided by the hearing assistive device may be used to enable or disable the extra help:

On body (e.g. attached to shirt) (open mode, no electrical contact): Use extra help from microphone array of the hearing assistive device (e.g. to update OTFVs from hearing aid wearer to microphones of the hearing assistive device).

Not on body (e.g. located in a pocket) (closed contact): No need for extra help.

By considering the time delay of arrival between the own voice of the hearing aid user (as detected in the hearing aid), and the voice picked up by the hearing assistive device (as detected in the hearing assistive device), it may be determined whether the attachment element is mounted on the same person (i.e. the hearing aid wearer, leading to a relatively small time delay) or another person (i.e. a different person than the hearing aid wearer, leading to a relatively high time delay). This and other related topics related to the use of the hearing assistive device as an external processing device to provide more processing power to the hearing aid is dealt with in our co-pending patent application number 22xxxxxx.x, entitled 'A hearing aid system comprising a hearing aid and an external processing device' which was filed at the European Patent Office on 25 Mar. 2022.

The hearing system comprises a user interface (UI) allowing a user to influence functionality of the system (the hearing aid(s) and/or the hearing assistive device (HAD)), e.g. to enter and/or leave a mode of operation, e.g. a 'communication (e.g. telephone) mode' or a 'Listening mode' (where sound from the hearing assistive device (HAD) is transmitted to the hearing aid (HD). The user interface may (UI) further allow information about the current mode of operation or other information to be presented to the user, e.g. via a remote control device, such as a smartphone or other communication device with appropriate display and/or processing capabilities (cf. signal UCI between the audio signal processor (HA-PRO) of the hearing aid and the user interface (UI) of the hearing system). Such information may include information from the hearing assistive device (HAD). In the embodiment of FIG. 6C, the user interface (UI) is indicated to forming part of the hearing aid (HD). It may, however, be implemented in other ways, e.g. as an APP of another device, e.g. a cellular phone (such as a smartphone).

It is intended that the structural features of the devices described above, either in the detailed description and/or in the claims, may be combined with steps of the method, when appropriately substituted by a corresponding process.

As used, the singular forms "a," "an," and "the" are intended to include the plural forms as well (i.e. to have the meaning "at least one"), unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will also be understood that when an element is referred to as being "connected" or "coupled" to another element, it can be directly connected or coupled to the other element, but an intervening element may also be present, unless expressly stated otherwise. Furthermore, "connected" or "coupled" as used herein may include wirelessly connected or coupled. As used herein, the term "and/or" includes any and all combinations of one or more of the associated listed items. The steps of any disclosed method are not limited to the exact order stated herein, unless expressly stated otherwise.

It should be appreciated that reference throughout this specification to "one embodiment" or "an embodiment" or "an aspect" or features included as "may" means that a particular feature, structure or characteristic described in connection with the embodiment is included in at least one embodiment of the disclosure. Furthermore, the particular features, structures or characteristics may be combined as suitable in one or more embodiments of the disclosure. The previous description is provided to enable any person skilled in the art to practice the various aspects described herein. Various modifications to these aspects will be readily apparent to those skilled in the art, and the generic principles defined herein may be applied to other aspects.

The claims are not intended to be limited to the aspects shown herein but are to be accorded the full scope consistent with the language of the claims, wherein reference to an element in the singular is not intended to mean "one and only one" unless specifically so stated, but rather "one or more." Unless specifically stated otherwise, the term "some" refers to one or more.

REFERENCES

US2010278365A1 (Phonak) 4 Nov. 2010

US2006233406A1 (Siemens Audiologische Technik) 19 Oct. 2006

The invention claimed is:

1. A hearing assistive device comprising:

a multi-microphone system for providing a processed input signal, the multi-microphone system comprising:

a multitude of microphones for picking up sound from an environment of the hearing assistive device, each of said multitude of microphones providing an electric input signal representing said sound;

a beamformer filter configured to receive said electric input signals, or signals originating therefrom, and to provide a spatially filtered signal in dependence of said electric input signals and fixed or adaptively determined beamformer weights;

an attachment element configured to fix the hearing assistive device to the body or clothes of a person, the attachment element being configured to be in different first, open and second, closed states; and wherein the multi-microphone system is configurable to operate in at least two modes in dependence of a mode control signal, said at least two modes comprising:

a) a directional mode wherein said multi-microphone system is configured to provide said processed input signal as a directional signal, b) an omni-directional mode wherein said multi-microphone system is configured to provide said processed input signal as a omni-directional signal; and wherein the attachment element is configured to provide an electric signal indicative of a current state of the attachment element; and wherein the hearing assistive device further comprises:

a mode controller for providing said mode control signal in dependence of said electric signal indicative of the current state of the attachment element;

wherein the attachment element in said first, open, state is configured to be attached to clothing or other body-worn items, and to enter said directional mode; and wherein the attachment element in said second, closed, state is configured to be un-attached to clothing or other body-worn items, and to enter said omni-directional mode.

2. The hearing assistive device according to claim 1 wherein the attachment element has a form of a clip comprising mutually movable first and second mechanical parts allowing the clip to grip and thereby to be attached to an item, and wherein the mutually movable first and second mechanical parts comprise respective first and second electrically conducting elements.

3. The hearing assistive device according to claim 2, wherein said first and second mutually movable mechanical parts and hence said first and second electrically conductive elements are configured to be spatially separated from each other in said first, open, state and to be electrically connected in said second, closed, state, respectively.

4. The hearing assistive device according to claim 1 wherein the mode controller is configured to bring the multi-microphone system into said directional mode when the attachment element is in said open state.

5. The hearing assistive device according to claim 1 wherein the mode controller is configured to bring the multi-microphone system into said omni-directional mode when the attachment element is in said closed state.

6. The hearing assistive device according to claim 1 comprising a housing wherein components of the hearing assistive device are enclosed.

7. The hearing assistive device according to claim 1 adapted to provide that the attachment element is mounted on or integrated with a housing of the hearing assistive device.

8. The hearing assistive device according to claim 1 comprising memory wherein beamformer weights of the beamformer filter, or parameters for determining such beamformer weights, are stored.

9. The hearing assistive device according to claim 1 wherein the attachment element comprises a shirt clip configured to be attached to a shirt or other clothing or substrate worn by or attached to a user.

10. The hearing assistive device according to claim 1 wherein the attachment element comprises first and second electrically conductive parts configured to be spatially separated from each other in said first, open state and to be electrically connected in said second, closed state, respectively.

11. The hearing assistive device according to claim 1 comprising a transmitter for transmitting said processed input signal, or a signal originating therefrom, to another device.

12. The hearing assistive device according to claim 1 wherein the mode controller is configured to apply a delay in activation of a detected mode change.

13. The hearing system comprising a hearing assistive device according to claim 1 and a hearing aid, wherein said hearing aid comprises a receiver configured to receive audio data from said hearing assistive device.

14. The hearing system according to claim 13 comprising a user interface allowing a user to influence functionality of the system, including to enter and/or leave a mode of operation.

15. The hearing system according to claim 13 wherein said hearing aid is constituted by or comprises an air-conduction type hearing aid, a bone-conduction type hearing aid, a cochlear implant type hearing aid, or a combination thereof.

16. A hearing assistive device comprising a processor for processing an input audio signal and providing a processed input signal, and an attachment element comprising first and second mutually movable mechanical parts allowing the attachment element to grip an item, the hearing assistive device being configured to control said processing in the hearing assistive device in dependence of the attachment element being in a first or second state determined by monitoring a current flowing through said first and second mutually movable mechanical parts.

17. The hearing assistive device according to claim 16 whereon the different first and second states of the attachment element refers to mechanical as well as electrical states and wherein the first state is a state where the attachment element is mechanically and electrically open due to its gripping around said item, and wherein the second is a state where the attachment element is mechanically and electrically closed.

18. The hearing assistive device according to claim 16 comprising a noise reduction system comprising a directional system forming part of said processor.

19. The hearing assistive device according to claim 16 wherein said processing includes one or more of:

switching between two modes operation of said directional system;

applying direction of interest to a voice activity detector, by selecting between Own voice direction voice activity detector constraint in a shirt mode, and Omni-directional voice activity detector, otherwise; and switching between a multi-microphone-based noise reduction post filter of said noise reduction system in a shirt mode of operation and a single microphone-based noise reduction, or using directional information, in table mode of operation.

20. The hearing assistive device according to claim 19 wherein said switching between two modes operation of said directional system comprises one or more of switching between a fixed target direction mode and an adaptive target direction estimation mode of operation;

switching between a directional mode of operation and a non-directional, termed omni-directional, mode of operation; and switching between a near-field directional mode and far-field directional mode.

* * * * *